United States Patent
Fahey

(10) Patent No.: US 7,511,226 B2
(45) Date of Patent: Mar. 31, 2009

(54) ELECTRICAL WIRING FOR BUILDINGS

(76) Inventor: Mark T. Fahey, P.O. Box 144, Fulham Gardens, SA 5024 (AU)

( * ) Notice: Subject to any disclaimer, the term of this patent is extended or adjusted under 35 U.S.C. 154(b) by 0 days.

(21) Appl. No.: 10/532,213

(22) PCT Filed: Oct. 24, 2003

(86) PCT No.: PCT/AU03/01410

§ 371 (c)(1),
(2), (4) Date: Apr. 22, 2005

(87) PCT Pub. No.: WO2004/038879

PCT Pub. Date: May 6, 2004

(65) Prior Publication Data

US 2006/0011371 A1    Jan. 19, 2006

(30) Foreign Application Priority Data

Oct. 24, 2002    (AU) .............................. 2002952228

(51) Int. Cl.
*H01B 7/00*    (2006.01)
(52) U.S. Cl. ...................................... 174/135
(58) Field of Classification Search ................. 174/72 A
See application file for complete search history.

(56) References Cited

U.S. PATENT DOCUMENTS

| 2,532,800 | A | * | 12/1950 | Adinamis et al. ........... 219/473 |
| 4,815,984 | A |   | 3/1989 | Sugiyama et al. |
| 5,149,277 | A | * | 9/1992 | LeMaster .................... 439/207 |
| 5,292,257 | A | * | 3/1994 | Milan ......................... 439/214 |
| 5,501,605 | A |   | 3/1996 | Ozaki et al. |
| 6,486,407 | B1 | * | 11/2002 | Hawker et al. .......... 174/149 B |

FOREIGN PATENT DOCUMENTS

| DE | 40 26 718 A1 | 2/1992 |
| JP | 2002095145 A | 3/2002 |

* cited by examiner

*Primary Examiner*—William H Mayo, III
(74) *Attorney, Agent, or Firm*—The Nath Law Group; Jerald L. Meyer; Jiaxiao Zhang

(57) ABSTRACT

A wiring assembly for a building includes an electrical power supply backbone, a first end thereof being adapted to connect directly to an incoming mains power supply at a switch board of the building, the assembly further comprising a plurality of sockets which are electrically connected to the backbone at spaced apart locations along the length thereof, wherein in use, the sockets may be arranged to be located at spaced apart locations through a building for convenient connection thereto. A related method for wiring a building using the wiring assembly is also disclosed.

5 Claims, 3 Drawing Sheets

ELECTRICAL WIRING FOR BUILDINGS

This invention relates to electrical wiring for buildings and in particular relates to a method of electrical wiring of a building for mains electrical power supply, to looms for assistance in wiring, and to a building with and installation incorporating electrical wiring.

BACKGROUND OF THE INVENTION

To currently wire buildings for a supply of electrical mains power through the building it is common on a customized basis to have insulated cables strung through the building by a specialist electrician where each length of wire and each termination is uniquely and separately prepared and made by for instance baring at respective ends some of the insulation from a wire, inserting the thus bared raw end into a terminal junction, then tightening a screw so as to keep the wire in position.

Such a process is repeated for each length of wire and for each core for instance the active wire, the neutral wire and where appropriate the earth connection each at both ends of each wire and for each set of connections from terminal junction to terminal junction.

Any one of these joins can be a source of serious difficulty.

If any one of these joins is loose or works loose overtime and the bare wire stays close but is separated but within an arcing distance from adjacent conductors or the terminal block there becomes the high risk of arcing which will result in heating which in turn then can lead to adjacent vulnerable items starting to burn and of course the possible destruction by fire of the building.

Such wiring and joins are usually deliberately in places out of sight which means that if there is a problem it may not be readily observable and this then clearly leads to a potential serious danger. However this is the conventional system that exists for wiring of buildings.

A further difficulty is that, because any wiring by its current nature needing to be a customised process, does need specifically trained workman to accomplish the task. It is also implicitly a slow process because it is very much a manual process where a skilled worker (an electrician) estimates a size and quantity of cable to be used for each run in a building, prepares such cable, and then has to have a sufficient available stock of fittings, junctions, switches, and cables of various capacities on hand to complete a wiring job. Thousands upon thousands of buildings have been and are being wired in this way.

The usual joining method which is still widely used because it is traditional and economic involves a brass block with a number of smooth sided bores in it and for each bore a transversely aligned threaded bore through which a screw can be tightened. The end of a bared wire is inserted into a respective smooth sided bore and a metal screw is then tightened by screwing through the threaded bore to engage and clamp the wire and hold it thereby in position in bore and at the same time effect an electrical connection by simply establishing a clamping pressure either holding the wire against the conducting side of the smooth sided bore or additionally having some electrical contact through the screw. However the bore being formed of an opaque material (brass) does not allow the location of the end of the wire to be actually seen and a usual process for an electrician is that a wire is inserted and the electrician can feel that it has gone in enough to be sure that it will have a sufficient length in the bore for the screw to effectively engage and hold this.

Things do go wrong where especially for instance two or three bared wires are to be twisted together and inserted into the same bore so that it becomes a tight fit. If the feel test is deceived then there can be a dangerous situation with partial contact or worse where the wire or wires is or are loose and over time will intermittently contact with a possible result of arcing etc. Conversely a screw may simply not be tightened. There are other connectors and connection techniques but the above is a very common very economic system that is widely used.

The problems then can be seen which are that current systems do have difficulties and also incur costs that may be considered substantial.

DISCLOSURE OF THE INVENTION

One aspect of the present disclosure includes a wiring assembly or loom for a building comprising an electrical power supply backbone, a first end thereof being adapted to connect directly to an incoming mains power supply at a switch board of the building, the assembly further comprising a plurality of sockets which are electrically connected to the backbone at spaced apart locations along the length thereof, wherein in use, the sockets may be arranged to be located at spaced apart locations through a building for convenient connection thereto.

In preference, the sockets provide for insertion therein of a plug providing electrical connection for such plug with respective electrical conductors of the electrical power supply backbone, each of the plugs being electrically connected to an externally accessible fixed electrical socket in the building.

In preference, the backbone comprises at least one substantially continuous length of cable that is further comprised of at least two electrically insulated sets of electrically conducting cores of substantially continuous length, there being for the or each cable a set of the electrical sockets, where each socket is electrically connected to a separate set of the electrically conducting cores thereof.

In preference, the backbone comprises two or more substantially continuous lengths of cable that are held together at least at a beginning of the backbone.

In preference, the or each cable in the backbone comprises two separately insulated sets of electrically conducting cores of substantially continuous length, each set including an active, and a neutral core.

In preference, the or each cable in the loom comprises three separately insulated sets of electrically conducting cores of substantially continuous length, each set including an active, a neutral and an earth core.

In preference, the or each cable in the backbone comprises a further electrically insulated core of substantially continuous length, so that each of the electrical sockets in a set is electrically connected to a separate set of the electrically conducting cores and the further core, which is common to each socket.

In preference, the or each cable in the loom comprises two separately insulated sets of electrically conducting cores of substantially continuous length, each set including an active and a neutral core, where the further, common core is an earth.

In preference, the cores of the loom are, at the end of the loom adapted to be electrically connected to a mains switched supply, adapted to be bared so as to be connected to a traditional connector block.

A further aspect includes a method of wiring a building for the distribution of electrical power through the building where the building includes a mains power supply switch board adapted to be connected to a mains electrical power supply, the method including the steps of electrically connecting a wiring assembly or loom as described in claim 1 to the mains power supply switch board at its first end, and arranging the sockets so that these are located at spaced apart locations through the building for convenient connection thereto.

A further aspect includes a method of wiring a building for the distribution of electrical power through the building where the building includes a mains power supply switch board adapted to be connected or being connected to a mains electrical power supply, the method including the steps of having a pre-made up loom which has at one end electrically connecting ends adapted to be secured to the electrical power connections of the switchboard, a common trunk acting as a backbone extending along a length of the loom and having at each of spaced apart locations from the said first end, a female socket having electrical connections completed through a cable of the loom to interconnect electrically the respective receiving pins of the socket to the electrical supply of the switch board.

A further aspect includes a mains electrical power wiring loom for a building which is comprised of at least one cable each having at least two separately insulated electrically conducting cores where at least the cores are joined together at least at a beginning of the loom, and the cable or cables is or are each terminated with a female socket where there are a plurality of such outlets sockets which are adapted to be located at spaced apart convenient locations through a building for convenient connection thereto of for each switched outlet or appliance a male plug to engage with a respective one of the sockets.

In preference, there are at least two cables held together at a beginning of the loom.

In preference, the loom at its beginning has ends which are either bared or adapted to be bared so as to be able to be connected into a traditional connector block or other electrical connection.

In preference, at least one of the cables is a three core cable and it has at least one three-pin socket connected at its end.

In preference, each of the cables at its end has a length of cable which is free from been tethered to the remaining loom of cables.

In preference, each of these cables may in turn give rise to two at a plurality of branches stemming therefrom.

In preference, there is provided in conjunction with such a loom, at least one connector which comprises a cable having at one end a plug and at a further end a socket of a type adapted to the fixed into position as an accessible socket for a user of the building.

In preference, such a connector with its socket and its end also includes with the socket, a switch to effect an opening or closing of connection of the cable to the pins of the socket.

A further aspect includes a method of wiring a building for mains electrical power, where is the first step of locating a loom as characterised in any one of the preceding statements ready combination incorporating features of the previously described statements, so that had a beginning of the loom, at least two of the cables are connected to it electrical junction connectors such as those provided by an electrical power supplier authority either by way of a meter box or otherwise, and then locating the loom so that at least some of the sockets at the end in the locality for supply of an outlet socket where there is a connector having at one end a plug and at its other, the outlet socket, locating the socket relevant to the building for access by a building user that thereafter, and either before such installation or after such installation, connecting the plug of the connector to the socket of the loom.

It is anticipated that a wiring assembly or loom and respective connectors with blanks and outlets sockets can be manufactured very economically in a factory so that the cost associated with such manufacture can be small. Further, the control of quality in a factory environment can also be considered to be higher than might be the case where installation is individually customised for each building.

It is envisaged that such manufacture can also be accomplished in locations where costs associated with such manufacture can be kept very low.

Accordingly, the high-cost of an electrician having to individually locate and bare and connect cables within a building during the installation process can be reduced insofar as the time necessary for a lot of the baring of wires, connections and other main tasks associated with the traditional method can now either be reduced or removed.

It is envisaged that a wiring assembly or loom may in one case be a single cable with two or three cores or it can in another case include two or more cables each with either two or three cores and each would be terminated with a socket at different distances from the beginning of the loom.

In this way, an electrician installing the wiring will select a pre-manufactured wiring assembly or loom which would be closest to the specifications required for a particular building and which would be of an appropriate current carrying capacity in accordance with appropriate regulations, and then would simply locate the loom in a most efficient way so that the beginning of the loom is located adjacent the supply point for the electric power and then as many plugs as possible would be located in a modestly adjacent or in the vicinity of a location for a connector.

Each connector can be a length of cable in its own right at least in the one instance and would also be selected so as to comprise either of two or three cores appropriate to the application for example with three cores providing an earth, or with two cores such as might be used for connection with lights or other remote appliances where an earth is of no consequence. In each case it would be either connected to for instance a light socket or a power socket which is then appropriate for connection to a wall, and architrave, a skirting, the ceiling or like.

The electrician or installer would have a variety of such connectors, which would be simply selected and connected as considered most appropriate for the particular socket from the loom, which has been chosen.

The significant advantage expected from this arrangement is that the wiring itself will have been terminated in factory conditions where quality control can be of the highest level and it can be in each case, pre-inspected and even tested prior to sale or installation in the building.

The job of the installer then becomes less variable.

It is expected that in some installations, a wiring assembly or loom may not be necessarily exactly appropriate for a particular installation but it is envisaged that, in such a case, one or more of the sockets in the loom will not be used or can be left for future connections, and there is significant advantage in the future therefore for even a home owner or building operator or other electrician, to simply then take a further connector and connect further connectors with outlets without this involving skill techniques or effort.

When reference has been made to "mains supply" it is envisaged that in most countries of the world, there is variously a mains supply of electrical power supplying power at either 50 Hertz or 60 Hertz and at voltages which can be approximately 110 volts, 240 volts or 450 volts. These measurements are indicative of what is understood to be indicated by the term "mains electrical power".

The wiring assembly or loom would be expected to be held together where there are a plurality of cables integrated within one common backbone or trunk and the way in which these cables may be held together can be varied and indeed as the technique becomes more useful and more extensive, it is envisaged that it could be an integration of such a common backbone or trunk cable system where there are however individual cores for each end termination but the way in which the cables at the beginning are held together, can either be by traditional cable ties, by electrical insulating wrapping, or by any other appropriate form which will hold the cables for convenient handling.

A further aspect includes a method of wiring a building and a building so wired where there is a pre made wiring assembly or loom which has a plurality of spaced apart female sockets at regular intervals along a length of the loom and which is strung through the building placing thereby sufficiently positioned female sockets at regular locations along the length of the loom and where outlets are then connected at a most conveniently located any one of the sockets by having for each a male plug to be connected thereto where the male plug is itself connected electrically to a unit such as a mounted switched outlet, or electrical appliance or the like. In this respect, before explaining at least one embodiment of the invention in detail, it is to be understood that the invention is not limited in its application to the details of construction and to the arrangements of the components set forth in the following description or illustrated in the drawing. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the invention, and together with the description, serve to explain the principles of the invention.

Those skilled in the art will appreciate that the conception upon which this disclosure is based may readily be utilised as a basis for designing other structures, methods, and systems for carrying out the several purposes of the present invention. It is important, therefore, to recognise that the claims should be regarded as including such equivalent constructions insofar as they do not depart from the spirit and scope of the present invention.

BRIEF DESCRIPTION OF THE DRAWINGS

For a better understanding of the invention it will now be described with reference to a preferred embodiment which shall be described with the assistance of drawings wherein.

BEST MODE FOR CARRYING OUT THE INVENTION

Figure 1:
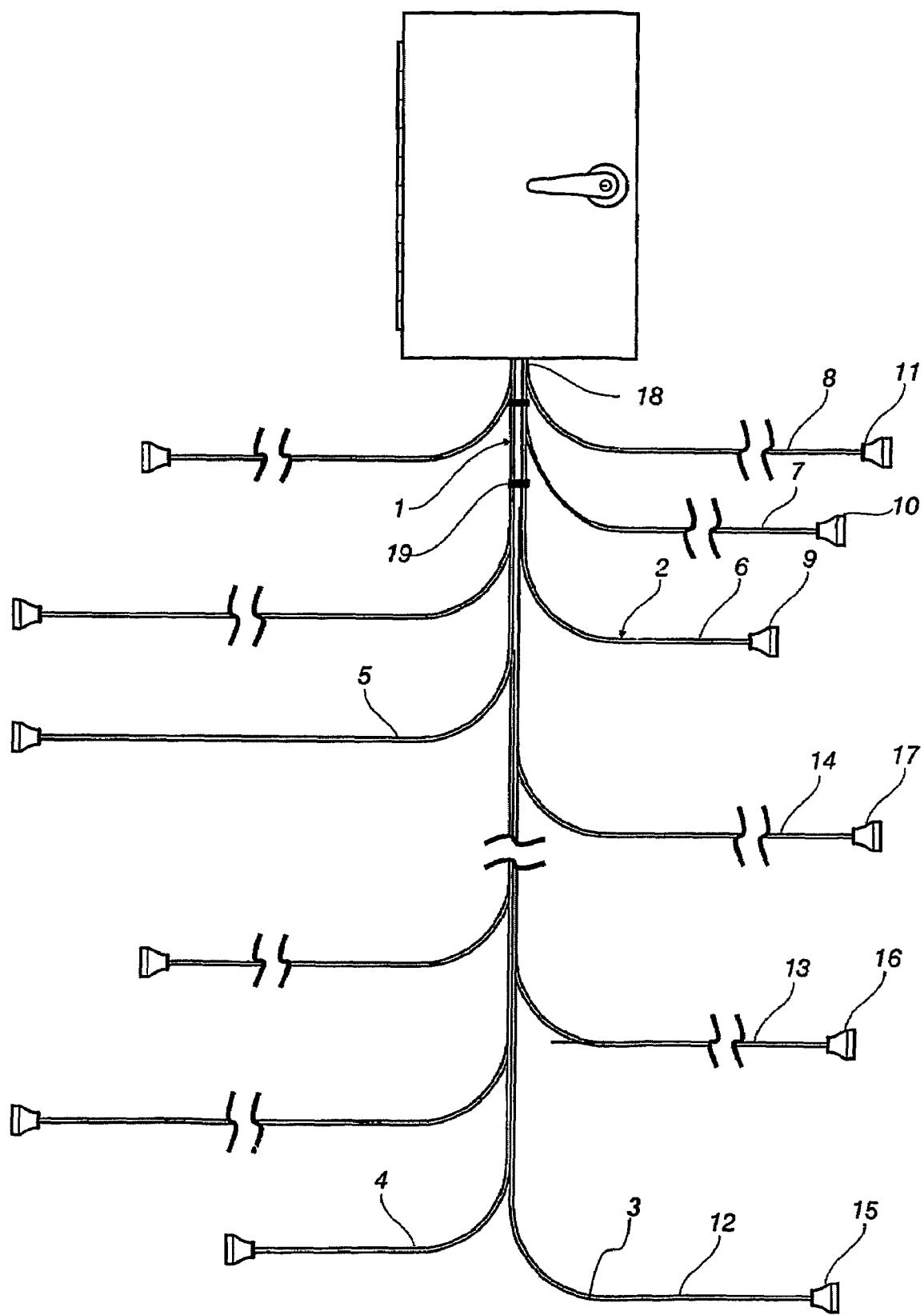
FIG. 1 illustrates loom in accordance with the embodiment.

Now referring to the drawings the assembly 1 is manufactured as a loom which includes in this case four separate cables 2, 3, 4, 5, each of which have three cores each which are each electrically insulated one from the other and which are held together so as to be kept in an adjacent alignment, and each of which are separately coloured in a traditional way in which earth, active and neutral cores are traditionally coloured with conventional mains electrical power wiring.

Each of these four cables are arranged in turn give rise to a plurality of branches stemming there from, each branch terminating at a female socket which is to say where the electrical connectors are embedded with the socket and it is there fore adapted to receive a male plug which has pins intended to enter into the female socket which are otherwise inaccessible and makes electrical connection thereby.

In this case cable 2 has branches 6, 7, 8 terminating at sockets 9, 10, 11 respectively. Similarly, cable 3 has branches 12, 13, 14 terminating at sockets 15, 16, 17 respectively.

Each of the plugs is both electrically connected to the backbone and physically located at a different but regular distance from the beginning 18 of the wiring assembly or loom 118 so as to allow for selection of a loom appropriate to a particular installation requirement. This first end 18 of the wiring assembly or loom 1 is adapted to connect directly to an incoming mains power supply at a switch board of the building. In practise the sockets are regularly placed apart from this first end 18 of the assembly, which means that there will be a socket at each of a same distance apart from an adjacent socket. This is intended therefore to ensure that there will be ample sockets and in practise it is assumed some of these will not be used as such so that while they may be surplus they are available to be used at a later time when the wiring is to be changed in the building or more outlets are required. By being female sockets they will not however have exposed electrically live parts and therefore can reside in the building and be used as an option in the distant future without unnecessarily exposing open electrical contacts. Also, because a pre-made wiring assembly or loom can be made in factory conditions and be in fact pre tested to ensure that it will be reliable. In such a case the electrician has much less to do with any customisation except to generally choose where the loom may be directed through a building.

The cables of the wiring assembly or loom 1 are in this case held together at the beginning 18 by a plurality of cable ties 19.

Figure 2:
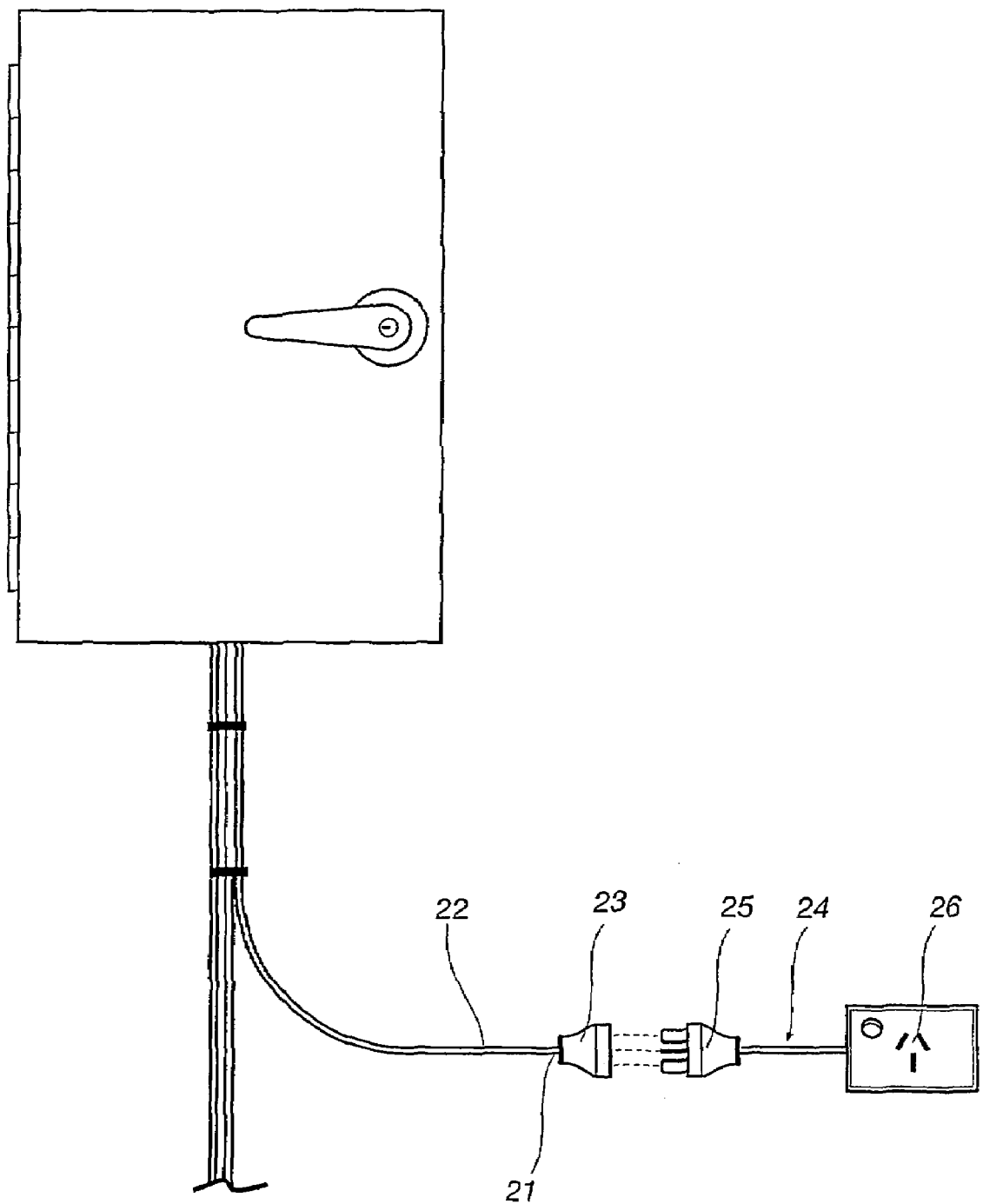
FIG. 2 illustrates a connector connecting a socket of one of the cables of the loom to an outlet socket.

Now referring to FIG. 2, where e end of a respective cable such as at 21, has a free length shown for instance at 22 which allows the sockets 23 to be located in an appropriate position for connection to it by a connector 24 which includes a male plug 25 at a first end which is adapted to fit within the sockets 23 and have at its other end, and an outlet socket 26 which is intended to be installed as a fixed installation within the building.

Figure 3:
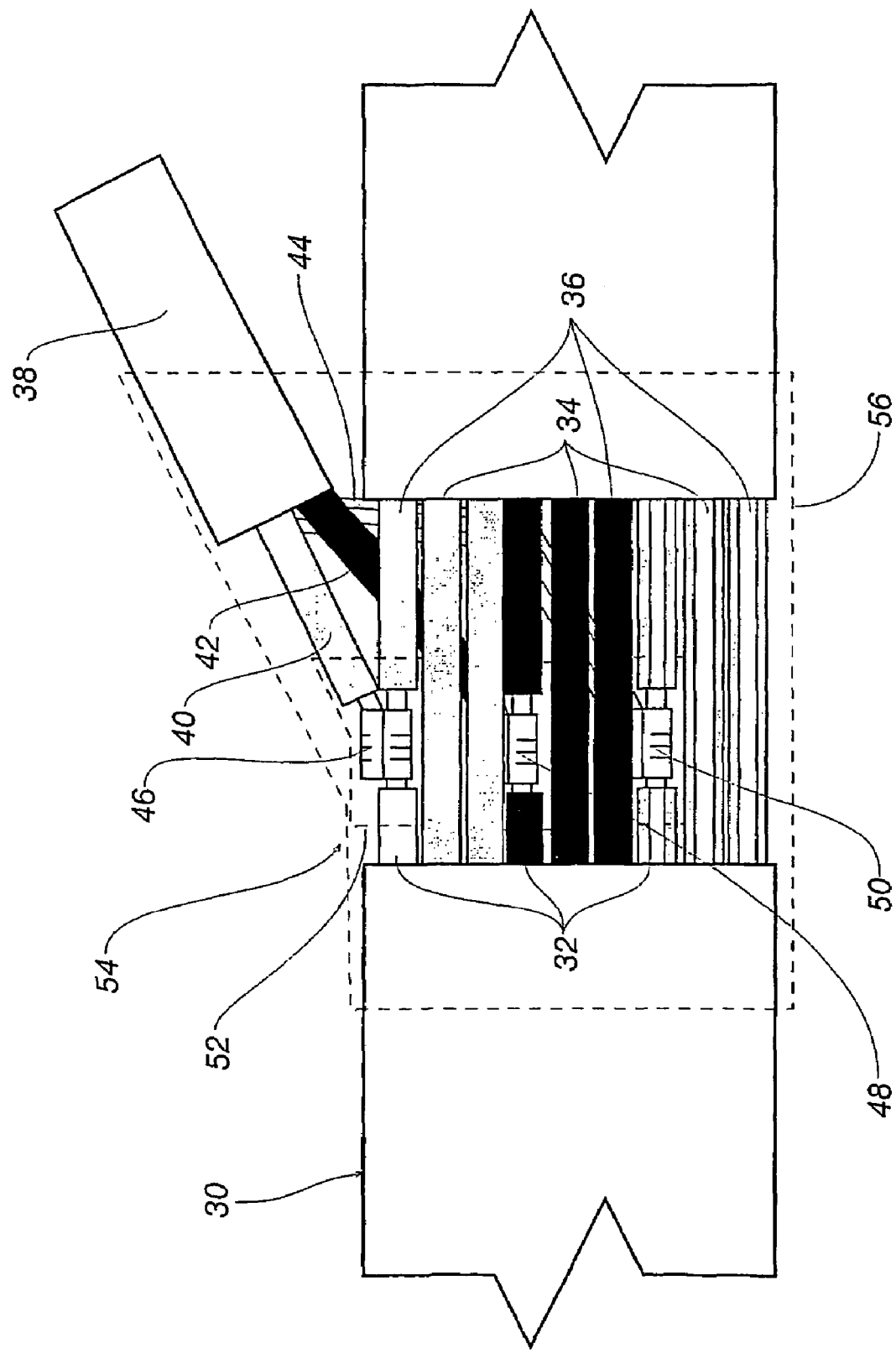
FIG. 3 illustrates the manner in which a branch is connected to the core loom.

Now referring to FIG. 3, where there is illustrated a cable 30 forming part of an electrical power supply backbone for a wiring assembly or loom 1, which is comprises three sets 32, 34 and 36 of three separately insulated cores (these being for each set active, neutral and earth cores).

Each of the three sets 32, 34 and 36 could be identified by running a further colour trace through them, in order to aid the electrician or installer with correctly identifying the cables comprising a 'set'.

The branch lead 38 to the outlet comprises three wires; a positive 40, negative 42 and an earth 44, and each of these is spliced into a corresponding wire in a respective core set 32 within the cable 30. In this case each wire has been spliced in using splice terminals 46, 48 and 50, and the connections created covered in self-amalgamating tape 52 (represented by dashed lines).

The connection point 54 of the cable 30 and the branch lead 38 is then covered using a glue lined 'Y' heat shrink 56 (represented by dashed lines).

It can be seen that this then facilitates pre-manufacture of a the wiring assembly or loom that is adapted for installation in a particular building. A wiring assembly or loom can be pre-designed or as might be the case in many instances, a standardised set of wiring assemblies may be made available so that the most appropriate one can be selected for installation in a particular house or building.

Also, the installer can be expected to have a set of connectors is which simply required to be plugged into position, with the length of any connector as appropriate for the particular sockets to be selected from the loom. It is envisaged that any particular cables in the wiring assembly or loom can also have two or more sockets electrically connected thereto provided that the current carrying capacity is appropriate for the regulations applicable to that particular installation.

It is appreciated that the installation described may use more components than is currently the case with a customised electrical wiring installation. However, on calculations thus far accomplished, it has been established that with economic manufacture in a factory situation, particularly with low-cost labour, a wiring assembly or loom may be a relatively small cost associated with the total cost of the building and especially the time necessary for a specialist electrician or other electrical installer to spend, on a one by one basis, baring wires and connecting electrical connectors.

There is also the significant advantage in safety in so far as that it would now be very unlikely for individual cores to be wrongly connected where this has been a difficulty in the past for instance where a neutral wire has been located in an active location and vice versa or even worse, one of the active or neutral wires being connected to an earth pin.

It is envisaged that there can be an extension connector provided at a beginning of a wiring assembly or loom so as to assist in the customisation of each particular application.

The invention claimed is:

1. A wiring assembly for a building comprising an electrical power supply backbone, a first end thereof being adapted to connect directly to an incoming mains power supply at a switch board of the building, wherein the backbone comprises at least one substantially continuous length of cable of three electrically insulated sets of electrically conducting cores, wherein three separately insulated sets of electrically conducting cores includes at least three active, neutral or earth wires, a plurality of branched electrical outlets, where each branched outlet is electrically connected to a separate arrangement of active, neutral and earth wiring from the respective electrically conducting cores, such that an electrical socket connected to a first branched outlet, forms part of an electrically separated circuit back to the main supply to that of another electrical socket connected to a second branched outlet having a different active, neutral and earth wiring arrangement.

2. The wiring assembly of claim 1, wherein the sockets provide for insertion therein of a plug providing electrical connection for such plug with respective electrical conductors of the electrical power supply backbone, each of the plugs being electrically connected to an externally accessible fixed electrical socket in the building.

3. The wiring assembly of claim 2, wherein the backbone comprises two or more substantially continuous lengths of cable that are held together at least at a beginning of the backbone.

4. The wiring assembly of claim 1, wherein the cores of the loom are, at the end of the loom adapted to be electrically connected to a mains switched supply, adapted to be bared so as to be connected to a traditional connector block.

5. The wiring assembly of claim 1, wherein the mains electrical power supply supplies power within the range of approximately 50 Hertz to 60 Hertz frequency and a voltage which will be approximately within a range of from 110 volts to 450 volts.

* * * * *